United States Patent
Zylstra

(10) Patent No.: US 7,500,284 B2
(45) Date of Patent: Mar. 10, 2009

(54) TURF SWEEPER AND DEBRIS REMOVAL MACHINE

(75) Inventor: Ed Zylstra, Burnaby (CA)

(73) Assignee: Pacific Omega Pack Enterprises Ltd. (CA)

( * ) Notice: Subject to any disclaimer, the term of this patent is extended or adjusted under 35 U.S.C. 154(b) by 571 days.

(21) Appl. No.: 10/906,567

(22) Filed: Feb. 24, 2005

(65) Prior Publication Data

US 2006/0185118 A1    Aug. 24, 2006

(51) Int. Cl.
*E01H 1/08* (2006.01)
(52) U.S. Cl. ...................... 15/340.3; 15/340.4
(58) Field of Classification Search ......... 15/340.3, 15/319, 320, 352, 340.4, 349; 300/21
See application file for complete search history.

(56) References Cited

U.S. PATENT DOCUMENTS

| | | | | |
|---|---|---|---|---|
| 3,837,038 | A * | 9/1974 | Kimzey et al. | ........... 15/349 |
| 3,947,912 | A | 4/1976 | Michaels | |
| 4,513,471 | A * | 4/1985 | Rahn | ........... 15/340.3 |
| 4,608,725 | A | 9/1986 | Jackson | |
| 4,914,774 | A | 4/1990 | Sheehan et al. | |
| 4,974,283 | A | 12/1990 | Holsten et al. | |
| 5,390,387 | A | 2/1995 | Dube et al. | |
| 5,417,538 | A | 5/1995 | Wilde | |
| 5,445,438 | A * | 8/1995 | Drumm | ........... 300/21 |
| 5,596,784 | A | 1/1997 | Tolmachoff | |
| 5,630,286 | A * | 5/1997 | Vanderlinden | ........... 37/227 |
| 5,742,968 | A | 4/1998 | Nicholson | |
| 6,854,157 | B2 * | 2/2005 | Strauser | ........... 15/340.4 |

FOREIGN PATENT DOCUMENTS

CA   2379587  A1   10/2003

* cited by examiner

*Primary Examiner*—Lee D Wilson
(74) *Attorney, Agent, or Firm*—Clifford W. Vermette; Denis R O'Brien; Vermette & Co.

(57) ABSTRACT

A turf sweeping machine having a frame, front and rear wheels coupled to the frame and an elongated chute mounted to the frame, the chute having an exit and an entrance at a level proximate to the grass of the turf. Rubber skirts are affixed to the chute and extend down to the grass of the turf across front, rear, and side walls of the chute. A rotatable brush is mounted to the frame, proximate to a bottom of the chute and extends across a width of the frame so that the brush brushes grass of a turf support surface. A hopper, which is also mounted on the frame, has an opening in fluid communication with the exit of the chute, and is positioned to receive material swept up the chute by the brush. A partial vacuum is created by rotation of the brush within the confines of the skirts and chute. This vacuum assists the brush in picking up waste material from the support surface.

11 Claims, 4 Drawing Sheets

TURF SWEEPER AND DEBRIS REMOVAL MACHINE

FIELD

The present invention relates to a machine that sweeps turf and removes debris and animal waste such as goose waste from the turf.

BACKGROUND

The rate at which parks, golf courses and other open areas are being affected by animal litter is increasing to the point of being of great concern. For example, there are approximately 300 million geese in North America alone. Each goose discharges 3-4 times per hour resulting in approximately 3-5 pounds of waste each day and obviously a good part of this finds itself on recreational turf. In addition, the proliferation of dogs compounds this problem. Turf or grass becomes littered not only with animal waste but also dead leaves, aeration plugs, cigarette butts, lid cups, straws, syringes, lighters, rocks, and garbage. The most difficult litter to deal with is animal waste and aeration plugs. For example, it is common for geese to congregate around ponds, which are commonly found on golf courses and parks. A large number of goose deposits are invariably found at such sites. Such deposits make it unpleasant for the users of such sites who will generally look for alternative venues for their activities.

Various sweeping machines have been developed over the years to deal with litter. Most such machines have a rotary brush, which sweeps debris and waste into a rearwardly positioned hopper. Some early sweepers were operated manually such as U.S. Pat. No. 3,947,912 issued to Michaels, the rotary brush of which is driven by ground contacting wheels when the vehicle is moved. U.S. Pat. No. 4,608,725 issued to Jackson describes a rotary drum with fingers that rotates against a counter rotating spring finger assembly to aid in the pickup of material from the drum. This material is deposited onto a conveyer, which directs the material into a hopper.

U.S. Pat. No. 4,914,774 issued to Sheehan, et al. discloses a leaf-loading machine designed to be towed behind a towing vehicle.

U.S. Pat. No. 5,390,387 issued to Dube, et al. discloses a wheeled self-propelled vehicle that has a forwardly mounted engine, a hopper and a brush mounted on the hopper. The hopper and rotary brush are lifted by pistons affixed to the frame. Dube further discloses a paddle wheeled type of rotary brush powered by a hydraulic motor, with the brush being mounted at the entrance to a pivotal hopper. The hopper can be lifted and tilted to empty the contents thereof into another vehicle but only with the aid of hydraulic piston cylinders. The rear wheel of Dube is pivotal in either direction while the front wheels are unidirectional. Some vertical adjustment of the brush relative to the frame is possible through the insertion or removal of spacers on resting feet. No adjustment of the brush relative to the hopper is provided for. The brush can be operated in either direction of rotation depending on the setting of a control lever. However, rotating the brush towards the back of the machine would cause excessive scattering of debris because of the lack of a skirt around the back of the entrance to the hopper.

None of the foregoing patents disclose a convenient system for adjusting the height of the brush relative to the turf. Such an adjustment is desirable as the optimum height of the brush varies with the type and condition of the turf.

SUMMARY OF THE INVENTION

According to the invention there is provided a turf sweeping machine having a frame, front and rear wheels coupled to the frame and an elongated chute mounted to the frame, having an exit and an entrance at a level proximate to the support surface for the wheels. A pair of elongated flexible skirts is affixed to the entrance of the chute and extends down to the support surface around the entire chute. A rotatable brush is mounted to the frame, proximate to a bottom of the frame of the chute and extends across the width of the frame so that the brush brushes grass of a turf support surface. A hopper, which is also mounted on the frame, has an opening in fluid communication with the exit of the chute, and is positioned to receive material projected up the chute by the brush. A means for driving the brush in rotation is provided. A partial vacuum is created by rotation of the brush within the confines of the skirts and chute. This vacuum assists the brush in picking up waste material from the support surface. The skirt functions not only to define the space where a vacuum is created but also to bend on encountering an obstacle, such as a rock, without breaking or damaging the area around the chute.

Preferably, the frame and the brush are vertically adjustable relative to the support surface by an adjustment to the height of the front wheels relative to the frame.

The front wheels are caster with a turf tire, freely rotatable, and each coupled to a lead screw that is manually rotatable in a threaded block mounted to the frame so as to raise and lower the front wheels relative to the frame and thereby adjust the height of the brush just skimming the support surface. The freely rotatable front wheels permit sharp turns without damaging any turf over which the machine is operating.

Pivot pins are mounted on each side of the frame and pivotally coupled to the hopper so that the hopper can pivot about a position near vertical alignment with its center of gravity.

The rotatable brush may have its fibers crimped to enhance their flexibility and enhance the ability of the brush to pick up material from the support surface. Preferably, the fibers of the brush are polyurethane.

A tow bar is pivotally coupled to the front of the frame to enable a pulling unit, such as a tractor, to pull the machine.

BRIEF DESCRIPTION OF THE DRAWINGS

Further features and advantages will be apparent from the following detailed description, given by way of example, of a preferred embodiment taken in conjunction with the accompanying drawings, wherein.

DETAILED DESCRIPTION WITH REFERENCE TO THE DRAWINGS

Figure 1:
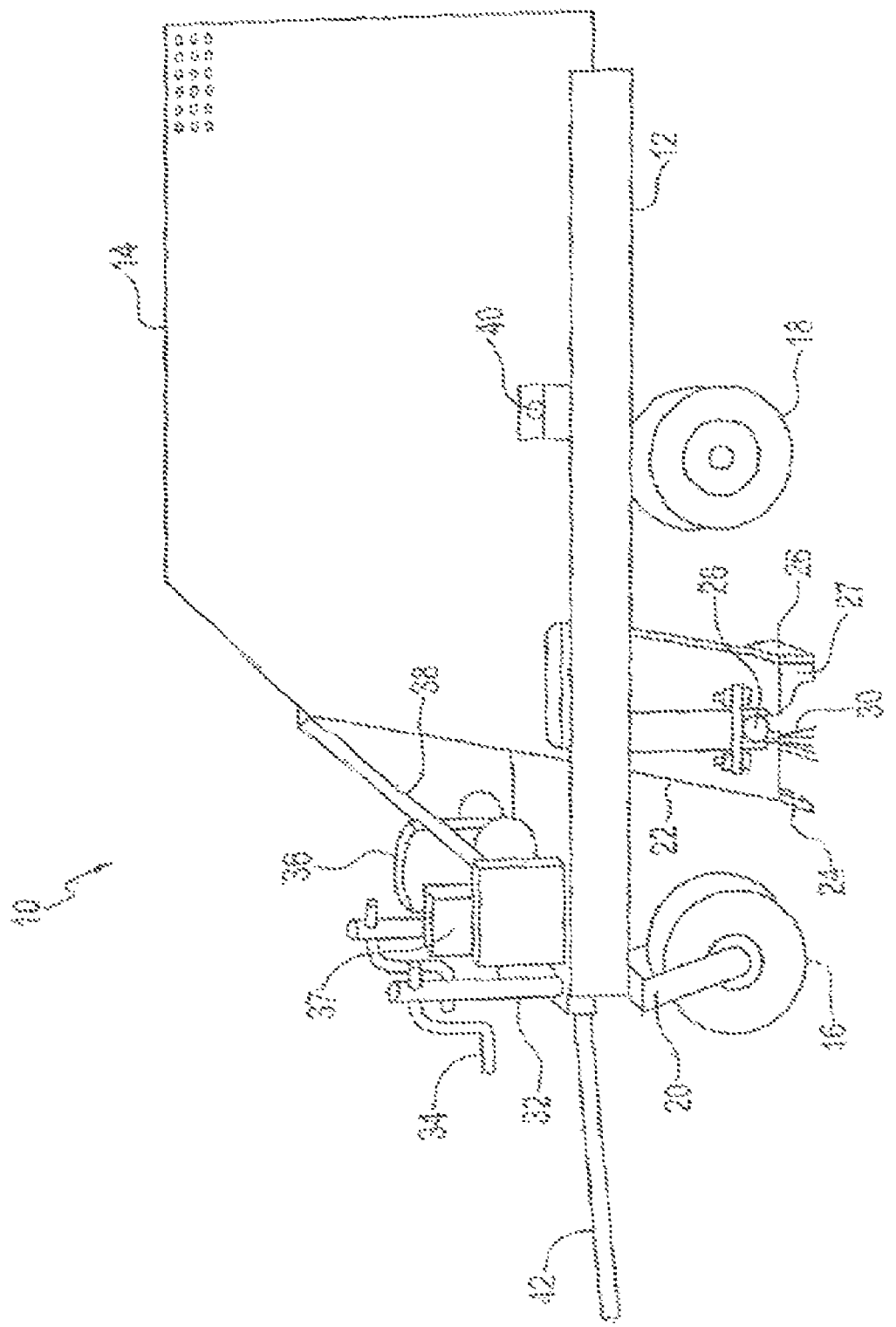
FIG. 1 is a side perspective view of the turf sweeper.

Referring to FIG. 1, the turf sweeper 10 has a frame 12 supported by two spaced apart non-pivotal wheels 18 mounted slightly towards the rear of the machine past the midway point of the frame and a pair of spaced apart pivotal wheels 16 mounted on casters 20 at the front of the machine 10. The pivotal wheels allow the turf sweeper to execute sharp turns without damaging the turf. Elongated tubes 32 carrying elongated lead screws extend along the interior of tubes 32 and couple to casters 20. Rotation of the lead screws is accomplished by rotation of a hand crank 34, which causes the front to raise or lower relative to the castors 20. Beneath the frame 12 there extends a chute 22 directed downwardly but angled slightly towards the forward of the machine. At the bottom of the chute there is mounted a rotatable brush 30 having two diametrically opposite elongated brushes extending along shaft 28. Brushes 30 are polyurethane crimped to enhance their flexibility. Flexible rubber skirts 24, 26 and 27 extend across the front, rear and sides of the chute 22 and brush the grass. Skirts 24, 26, and 27 function not only to prevent debris from scattering but entrain air that is moved by the rotating brush 30 to allow a vacuum effect in the chute that enables all of the debris to be picked up.

Figure 2:
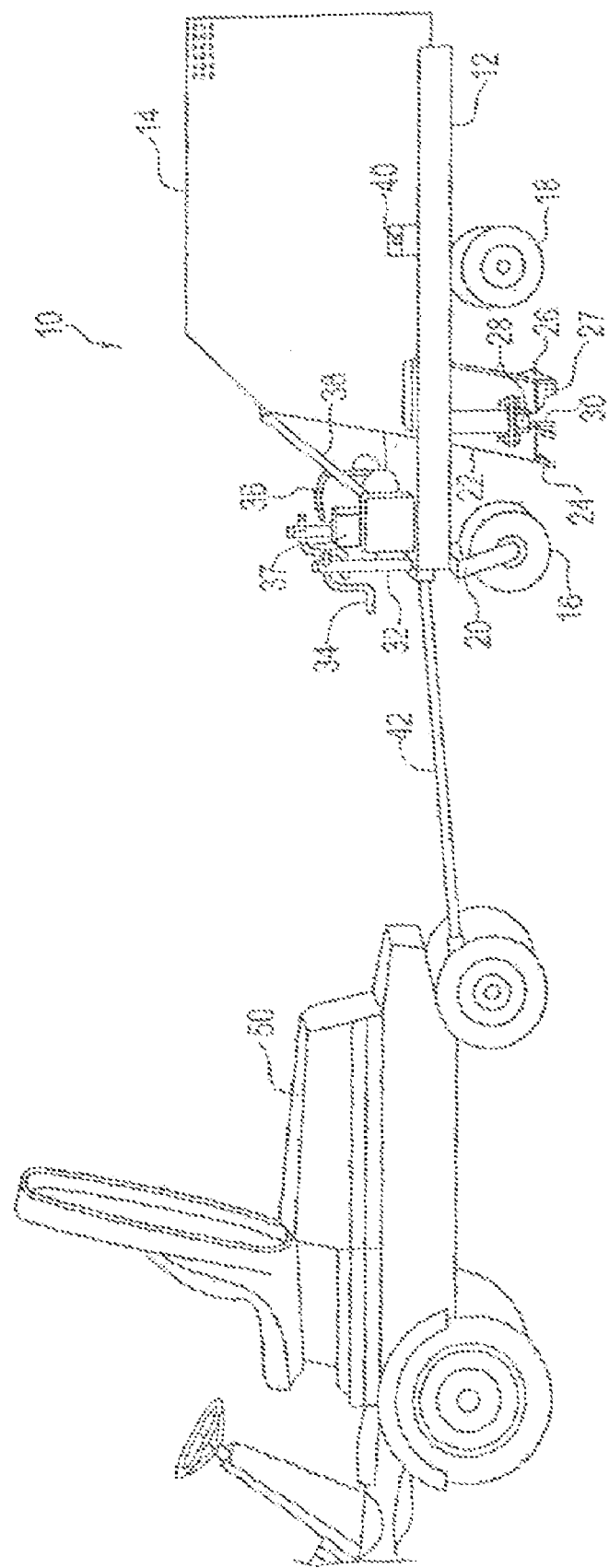
FIG. 2 is a side perspective view of the turf sweeper being towed by a tractor.

A motor 36 is mounted on a deck at the front of the turf sweeper 10 together with an electric actuator 37 that is used to extend and retract an electrically run, screw-driven cylinder 38. The electrically run, screw-driven cylinder 38 couples to a large hopper 14 that is mounted on the frame 12 just behind the motor. Hopper 14 is pivoted on bearings 40 mounted on either side of the frame 12 almost midway of the hopper 14. Consequently, the bearings support the hopper and create a pivotal point so the hopper can be manually tipped if the electric actuator 37 is disconnected. A tow bar 42 extends out from the front of frame 12 to which tow bar 42 is pivotally attached, as can be seen from FIG. 2. The end of the tow bar 42 is connected to the rear of a tractor 50. Although a tractor is shown as the pulling unit, any type of pulling unit could be used provided it had the requisite power.

Figure 3:
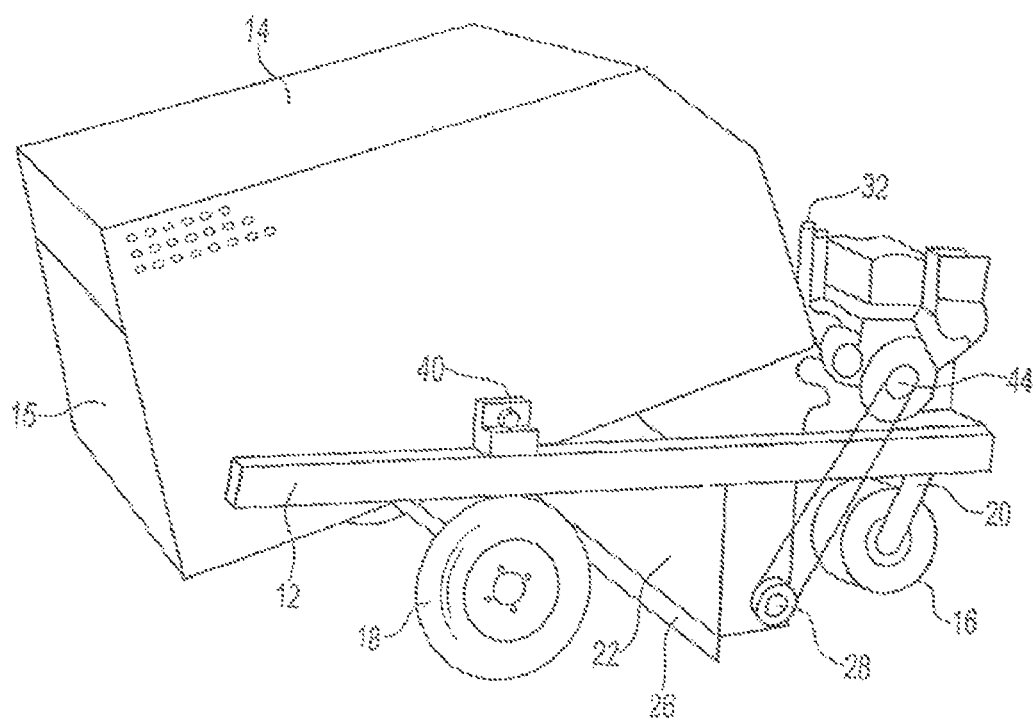
FIG. 3 is a perspective view of the turf sweeper with the hopper partially pivoted towards a dump position.

Referring to FIG. 3, the hopper 14 is shown in a slightly pivoted or tipped position in which the contents of the hopper can be emptied by opening the rear door 15 which is hinged along its top edge. Typically, the load of debris such as goose waste is dumped onto the ground in a pile or in a container or refuse area then picked up for use as compost or for later disposal.

Figure 4:
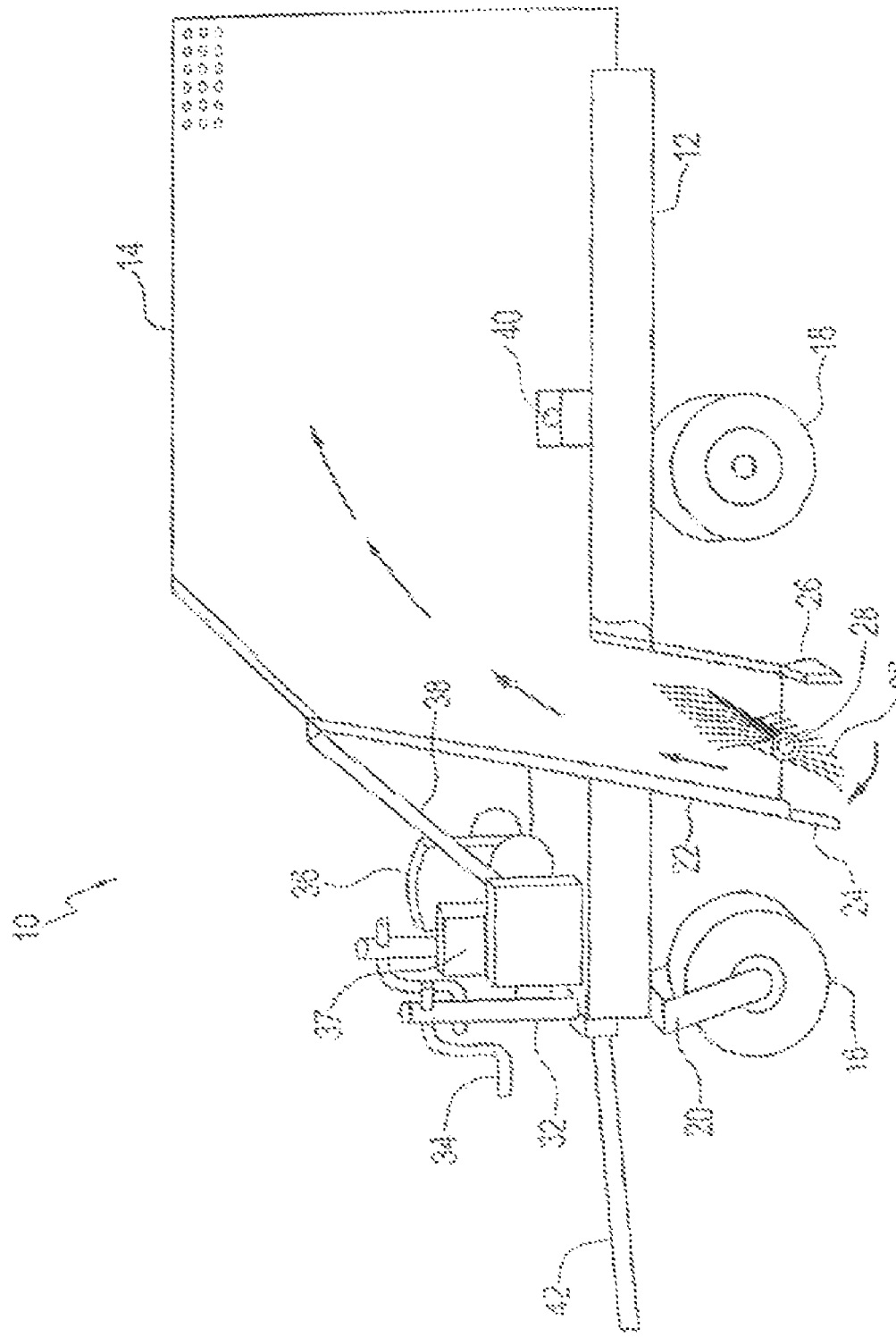
FIG. 4 is a side perspective view with an end wall of the chute and hopper removed to show the path of collected debris.

The operation of the turf sweeper 10 is seen in FIG. 4 in which a wall of the chute and hopper has been removed. As brush 30 driven by motor 36 rotates clockwise as seen in FIG. 4 such that the bottom of the brush rotates toward the front of the machine and the ends of the brush 30 touch the grass but not the ground and flick goose waste and debris up and along the path indicated by the arrows. By crimping the fibers of the brush 30, enough flexibility is imparted to the brush that it does not damage the grass as it rotates. The speed of rotation of the brush 30 may vary from about 600 rpm to about 2,200 rpm. At these high speeds, air is literally swept up from the grass into the chute 22 and hopper 14 due to the shielding by skirts 24, 26, and 27 causing a vacuum to be generated at the bottom of the chute 22 that helps pick up debris. A hydrostatic clutch (not shown) is used to engage and disengage the rotation of the brush 30.

It has been found that the turf sweeper removes goose waste, aerated plugs and other debris. It is particularly effective on the greens of golf courses where the casters prevent damage to the delicate greens.

Accordingly, while this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is therefore contemplated that the appended claims will cover any such modifications or embodiments that fall within the true scope of the present invention.

What is claimed is:

1. A machine for sweeping up loose material from grass, said machine comprising:
   (a) a frame;
   (b) at least two front wheels fixedly coupled to said frame, said wheels each comprising a screw mechanism moving said frame relative to said each wheel;
   (c) at least one rear wheel coupled to said frame;
   (d) a chute mounted to said frame, said chute comprising i) a front wall; ii) a rear wall; iii) an exit; and, iv) an entrance, said entrance being at a level proximate the grass;
   (e) a pair of elongated flexible skirts affixed to said chute and extending downwards and across said front and said rear walls of said chute;
   (f) a rotatable brush mounted to said frame, wherein said brush is contained within the confines of said pair of skirts and said chute, said brush having a bottom portion that brushes the grass when said brush rotates;
   (g) a hopper mounted on said frame, said hopper having an opening in fluid communication with said exit of said chute, wherein said hopper is positioned to receive material thrown up said chute by said brush; and,
   (h) a motor for rotating said brush;
   whereby a partial vacuum is created by rotation of said brush within said pair of skirts and said chute, which vacuum assists said brush in picking up and projecting waste material from the grass into said hopper.

2. The machine of claim 1, wherein said front wheel is a freely rotatable caster.

3. The machine of claim 1, further comprising at least one pivot pin mounted on each side of said hopper and pivotally coupled to said frame, whereby said hopper pivots about said pivot pins.

4. The machine of claim 1, further comprising a hydrostatic clutch coupled between an output of said motor and said brush.

5. The machine of claim 1, wherein said rotatable brush comprises fibers crimped to enhance their flexibility.

6. The machine of claim 5, wherein said fibers are polyurethane.

7. The machine of claim 1, further comprising a tow bar coupled to a front of said frame.

8. The machine of claim 1, further comprising:
   (a) a threaded block mounted to said frame; and,
   (b) a lead screw rotatable in said block, wherein the height of said front wheel relative to said frame is adjusted by rotating said lead screw in said block thereby adjusting the height of said brush above the grass.

9. The machine of claim 1, wherein said brush comprises at least two rows of crimped, polyurethane fibers.

10. The machine of claim 1, wherein said brush comprises at least two diametrically opposed rows of fibers.

11. The machine of claim 1, wherein said bottom portion of said brush moves towards the front of said machine when said brush rotates.

\* \* \* \* \*